Figure 5:
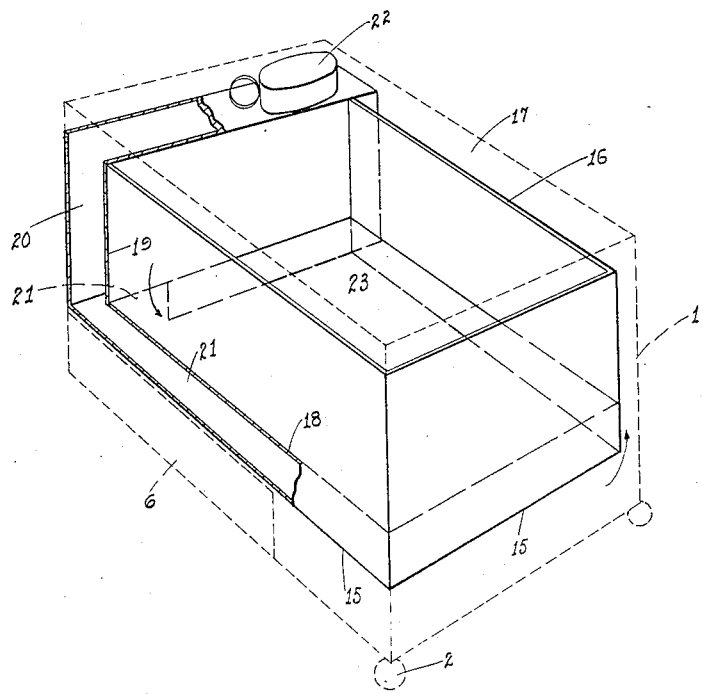

M. KRZEWINSKI.
LUNCH HEATER.
APPLICATION FILED DEC. 19, 1911.
1,045,857.
Patented Dec. 3, 1912.
2 SHEETS—SHEET 1.
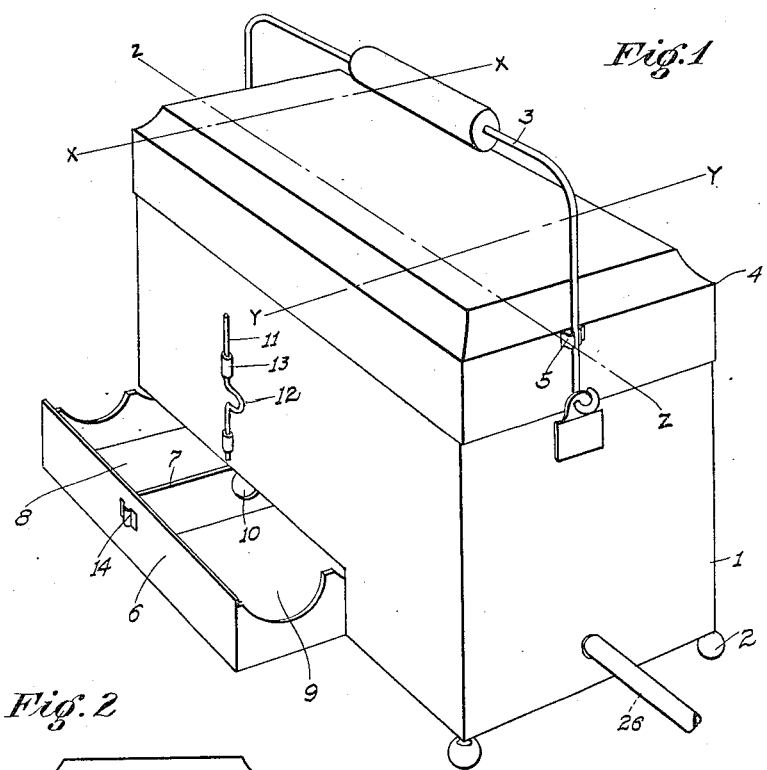
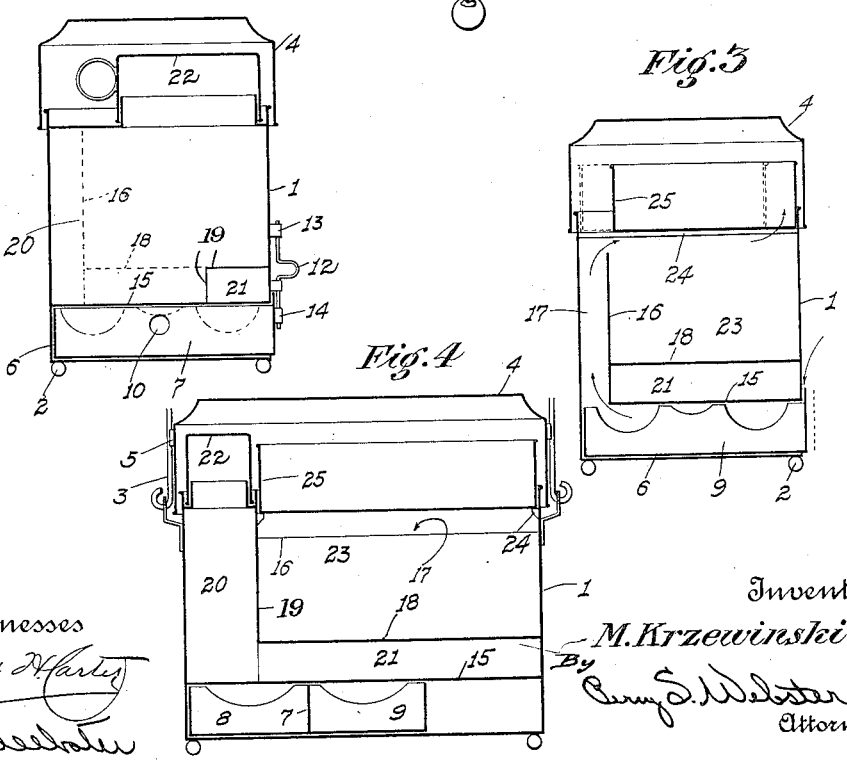
Witnesses
Inventor
M. Krzewinski
By
Attorney

M. KRZEWINSKI.
LUNCH HEATER.
APPLICATION FILED DEC. 19, 1911.

1,045,857.

Patented Dec. 3, 1912.
2 SHEETS—SHEET 2.

Witnesses
Clarence Smith
J. B. Webster

Inventor
M. Krzewinski
By Percy S. Webster
Attorney

UNITED STATES PATENT OFFICE.

MIKOLAJ KRZEWINSKI, OF LOS ANGELES, CALIFORNIA, ASSIGNOR OF ONE-HALF TO CHARLES BOCZKOWSKI.

LUNCH-HEATER.

1,045,857. Specification of Letters Patent. Patented Dec. 3, 1912.

Application filed December 19, 1911. Serial No. 666,792.

*To all whom it may concern:*

Be it known that I, MIKOLAJ KRZEWINSKI, a citizen of the United States, residing at Los Angeles, in the county of Los Angeles, State of California, have invented certain new and useful Improvements in Lunch-Heaters; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in lunch buckets and particularly to a means for heating the lunch in said buckets, the object of the invention being to produce a lunch heater in which liquids and the solid foods in the buckets may be heated as may be desired and also one in which anything desired to be fried may be fried, or in fact any kind of food can be heated or cooked if desired.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claims.

In the drawings similar characters of reference indicate corresponding parts in the several views.

Figure 1 is a perspective view of my completed lunch heater. Fig. 2 is a sectional view taken on a line X—X of Fig. 1. Fig. 3 is a sectional view taken on a line Y—Y of Fig. 1. Fig. 4 is a sectional view taken on a line Z—Z of Fig. 1. Fig. 5 is a perspective view showing the outer sides of the bucket in dotted lines and showing the inner compartments of the bucket in solid lines, some partly broken out and in section.

Referring now more particularly to the characters of reference on the drawings, 1 designates the lunch bucket which may have supporting feet 2 and the usual bail 3, a lid 4, said lid being provided with a slotted clip 5 to receive the handle 3 to hold it in upright position and lock the lid onto the bucket as appears in Fig. 1.

In the bottom of the bucket 1 I provide a drawer 6 slidable into said bucket 1 and having a partition wall 7 dividing said drawer into compartments 8 and 9 into which can be filled alcohol or such other fuel as may be desired, there being a connecting orifice 10 between the compartments 8 and 9 for a purpose as will appear.

On the face of the bucket 1 is a pin 11 having a handle 12, such pin being slidable through guides 13 on the bucket 1 and its lower end being adapted to be projected into a slotted guide 14 in a drawer 6 to lock said drawer in position when the heater is not being used. When the heater is being used, however, this pin fits between the inner edge of the drawer 6 and the outer side of the bucket 1 and forms an air inlet to give the burning fuel in the drawer 6 sufficient draft or ventilation to permit it to burn properly. Above the drawer 6 is a false bottom 15 to the bucket 1, which projects partway across the width of said bucket and is provided with a backwall 16, leaving an intervening space 17 through which the heat from the heater passes.

Disposed above the false bottom 15 is a partition 18 extending partway across the length of the bucket 1 and having an end wall 19, these two members 18 and 19 forming a side space 20 and a bottom space 21 into which may be filled liquids such as coffee, tea, milk or the like, the top of said space 20 being covered by an inverted cup 22, which may be used for drinking purposes. The two members 18 and 19 also form another chamber 23 into which may be filled solid foods, this chamber 23 having on its sides within the upper end thereof inwardly projecting lugs 24 adapted to support a tray 25 of a lesser width than the bucket 1. The top edge of the wall 16 is spaced below the bottom of said tray 25. If it is desired to fry food the tray 25 is moved along on the lugs 24 until it assumes the position shown by dotted lines in Fig. 3, which places it directly over the heat space 17 and causes the heat to pass over the chamber 23 and under the tray 25, which gives sufficient heat to fry the food and incidentally to keep warm the food chamber. If, however, it is not desired to cook any food in the tray 25 it is moved to the position shown by solid lines in Fig. 3, and the heat then passes up from the space 17 to the atmosphere without passing under the tray 25.

If it is desired to use the fuel drawer 6 for the purpose of heating curling irons or other devices the same may be inserted through hole 10 on the wall 6 and the fire will then heat them to the desired degree.

My same system of compartments, etc., could be used on a large scale for cafeteria service by admitting gas or electric heat through the pipes or wires as at 26.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A lunch heater comprising a bucket, a false bottom in said bucket spaced from the real bottom of said bucket and projecting partway across the width of said bucket, an end wall on said false bottom, a fuel drawer adapted to slide into said bucket beneath said false bottom, a sliding tray disposed in said bucket, said tray being of a lesser width than said bucket and adapted to project over said end wall, the top edge of said end wall being spaced a distance from the bottom of said sliding tray, as described.

2. A device of the character described comprising a bucket, a false bottom in said bucket, said false bottom being of a lesser width than the width of said bucket, a back wall on said false bottom spaced from the side of said bucket and forming an intervening space, such space communicating with the space between said false bottom and the real bottom of said bucket, a horizontal partition spaced above said false bottom and extending from one side of said bucket to the wall connected with said false bottom, said partition being of a lesser length than the length of said bucket, a wall on one end of said partition, said wall being spaced from the end of said bucket and forming an intervening space, such space communicating with the space between said partition and the said false bottom, a cover for said bucket and a fuel receptacle adapted to be projected between said false bottom and the real bottom of said bucket, as described.

In testimony whereof I affix my signature in presence of two witnesses.

MIKOLAJ ✕ KRZEWINSKI.
his mark

Witnesses:
PERCY S. WEBSTER,
STEPHEN N. BLEWETT.

---

Copies of this patent may be obtained for five cents each, by addressing the "Commissioner of Patents, Washington, D. C."